Patented Jan. 18, 1949

2,459,736

UNITED STATES PATENT OFFICE 2,459,736

THIAZYL SULFENAMIDES

George E. P. Smith, Jr., and Edward L. Carr, Akron, Ohio, assignors to The Firestone Tire & Rubber Company, Akron, Ohio, a corporation of Ohio No Drawing. Original application May 26, 1943, Serial No. 488,555. Divided and this application January 23, 1948, Serial No. 4,075

4 Claims. (Cl. 260—302)

This invention relates to a new class of chemical compounds which are valuable accelerators of the vulcanization of rubber or rubber-like substances.

This application is a division of our copending application Serial No. 488,555, filed May 26, 1943, now Patent No. 2,445,722.

It is a primary object of the present invention to provide a new class of chemical compounds.

Another object is to provide a new class of improved rubber vulcanization accelerators of the delayed-action, non-scorching type.

The above and further objects will be manifest in the description of the invention which follows.

It has been found that members of a new class of chemical compounds are very effective in accelerating the vulcanization of natural or synthetic rubber. The new compounds may be conveniently prepared by oxidizing a mixture of a non-arylene 2-mercaptothiazole and ammonia or a primary amine. The preparative oxidation reaction may be effected by treating a mixture of the mercaptothiazole and an excess of the amine in an alkaline aqueous medium with one of the following oxidizing agents: chlorine, bromine, iodine, hypochlorous acid, hypobromous acid, hypoiodous acid, and alkali metal and alkaline earth metal salts of said acids. The oxidation reaction is believed to comprise the direct action of the oxidizing agent on a mixture of the mercaptothiazole and one equivalent of the amine. The desired substances produced by this oxidation reaction are organic compounds containing nitrogen and sulfur.

The new class of chemical compounds possesses the following type formula:

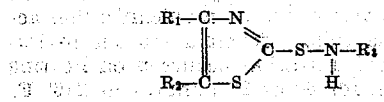

wherein $R_1$ and $R_2$ are hydrogen or alkyl radicals, at least one of said $R_1$ and $R_2$ being an alkyl radical, and $R_3$ is hydrogen, an alkyl radical, or a cyclo-alkyl radical. Thus, the new compounds are derivatives of sulfenamide ($HSNH_2$). Examples of alkyl and cyclo-alkyl radicals include methyl, ethyl, propyl, butyl, amyl, hexyl, heptyl, octyl, decyl, lauryl, cyclohexyl, methylcyclohexyl, benzyl and similar radicals.

The following specific examples are presented for illustrative purposes only, and are not to be construed as limiting the invention thereto.

Example 1

A solution consisting of 500 ml. of ether and 100 grams of chloro-acetone was poured on to 119 grams of ammonium dithiocarbamate (prepared from ammonia and carbon disulfide) in a 2-liter Erlenmeyer flask. The resulting mixture consisted of two phases, the ether solution of chloro-acetone and the solid phase of ammonium dithiocarbamate. In the course of 15 minutes the ether began to boil. The reaction was vigorous for an hour and then subsided. The mixture was allowed to stand at room temperature for several hours and then was filtered. The filtrate, a light yellow ether solution, was evaporated on a steam bath to leave a residue of a dark brown liquid which solidified upon cooling. The solid residue was leached with dilute sodium hydroxide solution, and the leachings were then acidified with hydrochloric acid to precipitate a cream-colored crystalline solid melting at 85–87° C. This solid, 2-mercapto-4-methylthiazole, was obtained in a yield of 78 grams.

An aqueous solution was prepared containing 31 grams of the mercaptothiazole, 82 grams of cyclohexylamine and 19 grams of sodium hydroxide in a volume of 800 ml. An aqueous iodine solution, containing 60 grams of iodine and 60 grams of potassium iodide in a volume of 650 ml., was gradually added to the solution of the thiazole and amine, with stirring, over a period of two hours, the reaction solution being maintained at a temperature of 8–10° C. The solid product which precipitated from the reaction mixture was separated and dried. This product, N-cyclohexyl (4-methyl-2-thiazyl) sulfenamide, was obtained as 40 grams of cream-colored crystals melting at 50–51° C. This sulfenamide derivative possesses the following formula:

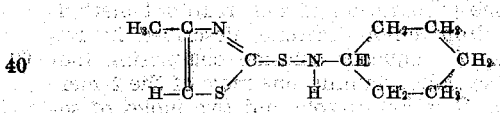

The sulfenamide was tested as a rubber vulcanization accelerator by comparing it with the standard accelerators, mercaptobenzothiazole and dibenzothiazyl disulfide, the latter being a delayed-action accelerator, in the following rubber formula:

| Ingredients: | Parts by weight |
|---|---|
| Rubber (smoked sheets) | 100.00 |
| Sulfur | 3.00 |
| Zinc oxide | 5.00 |
| Stearic acid | 1.10 |
| Accelerator | 0.75 |

Samples of the three rubber compositions, so formulated, were heated for 30 minutes at 240° F. to determine whether or not they possessed any tendency to pre-vulcanize or set-up during processing operations prior to the usual vulcanizing step, and the following physical testing data were obtained:

| Accelerator | Modulus of Elasticity in lbs./in.² at elongation of 600% | Tensile Strength in lbs./in.² at break |
|---|---|---|
| Mercaptobenzothiazole | 375 | 2,175 |
| Dibenzothiazyl disulfide | No cure | No cure |
| N-cyclohexyl (4-methyl-2-thiazyl) sulfenamide | do | Do |

Other samples of the same rubber compositions were heated for 20 minutes at 280° F. to determine the relative accelerating properties of the respective accelerators, and the following data were obtained:

| Accelerator | Modulus of Elasticity in lbs./in.² at elongation of 600% | Tensile Strength in lbs./in.² at break |
|---|---|---|
| Mercaptobenzothiazole | 650 | 2,550 |
| Dibenzothiazyl disulfide | 525 | 2,450 |
| N-cyclohexyl (4-methyl-2-thiazyl) sulfenamide | 1,675 | 3,775 |

The two sets of testing data given above show that the sulfenamide derivative from cyclohexylamine and 2-mercapto-4-methylthiazole is an excellent delayed-action accelerator, since the rubber composition including it did not vulcanize at the relatively low vulcanizing temperature of 240° F. (which is often reached during factory processing of a rubber composition), in contrast with the composition including the standard accelerator, mercaptobenzothiazole. Furthermore, the new accelerator imparted very high physical properties to the rubber composition after a short cure at 280° F., in comparison with mercaptobenzothiazole and the standard delayed-action accelerator, dibenzothiazyl disulfide.

*Example 2*

Ammonium dithiocarbamate was condensed with 3-chloro-2-butanone (B. P. 113–116° C., separated by distillation from a commercial sample of chlorinated methyl, ethyl ketone) to produce 2-mercapto-4,5-dimethylthiazole (light yellow crystals, melting at 162–163° C.) in a manner similar to the preparation of 2-mercapto-4-methylthiazole from chloro-acetone, described in Example 1. An aqueous solution comprising four moles of cyclohexylamine, one mole of the 2-mercapto-4,5-dimethylthiazole and two moles of sodium hydroxide was oxidized at 8–10° C. by an iodine-potassium iodide solution to produce a 93 per cent yield (based upon the thiazole) of N-cyclohexyl (4,5-dimethyl-2-thiazyl) sulfenamide, having the following formula:

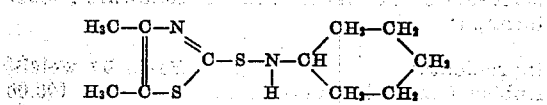

The above sulfenamide was obtained as white, glistening, crystalline leaflets, melting at 92–94° C.

In a similar manner, a solution of ten moles of isopropylamine, one mole of 2-mercapto-4,5-dimethylthiazole and two moles of sodium hydroxide was oxidized by iodine to produce a yield of 80 per cent of N-isopropyl (4,5-dimethyl-2-thiazyl) sulfenamide, having the following formula:

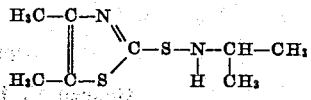

The isopropyl derivative was obtained as a white, crystalline solid, melting at 62–63° C.

The above two derivatives of 4,5-dimethyl-2-thiazyl-sulfenamide were tested as vulcanization accelerators in the rubber formula set out in Example 1. No vulcanization resulted on heating the compositions containing the sulfenamide derivatives for 30 minutes at 240° F. On heating the rubber compositions for 20 and 40 minutes at 280° F. the following data were obtained:

| Accelerator | Modulus of Elasticity in lbs./in.² at elongation of 600% | | Tensile Strength in lbs./in.² at break | |
|---|---|---|---|---|
| | 20 min. | 40 min. | 20 min. | 40 min. |
| N-cyclohexyl (4,5-dimethyl-2-thiazyl) sulfenamide | 1,650 | 2,775 | 3,475 | 3,725 |
| N-isopropyl (4,5-dimethyl-2-thiazyl) sulfenamide | 1,475 | 2,600 | 3,150 | 3,700 |

*Example 3*

Ammonium dithiocarbamate was condensed with 1-chloro-2-butanone (B. P. 134–136° C., separated by distillation from a commercial sample of chlorinated methyl, ethyl ketone) to produce 2-mercapto-4-ethylthiazole (yellow solid melting at 80–85° C.) A cold aqueous solution containing one mole of the thiazole, three moles of cyclohexylamine and two moles of sodium hydroxide was oxidized by iodine to form a 77 per cent yield of N-cyclohexyl (4-ethyl-2-thiazyl) sulfenamide having the following formula:

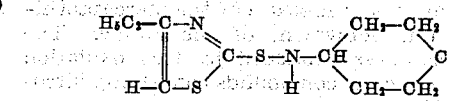

This sulfenamide derivative was obtained as a soft, tan-colored solid, melting at 65–68° C. The new compound was tested as a vulcanization accelerator in the rubber formula set out in Example 1. No vulcanization occurred on heating the composition for 60 or 80 minutes at 240° F., indicating that the compound is an extremely safe delayed action accelerator. When the composition was heated 40 and 60 minutes at 280° F. the following data were obtained:

| Accelerator | Modulus of Elasticity in lbs./in.² at elongation of 600% | | Tensile Strength in lbs./in.² at break | |
|---|---|---|---|---|
| | 40 min. | 60 min. | 40 min. | 60 min. |
| N-Cyclohexyl (4-ethyl-2-thiazyl) sulfenamide | 2,650 | 2,600 | 3,650 | 3,800 |

Example 4

A commercial mixture of 1-chloro-2-butanone and 3-chloro-2-butanone (approximately one part to three parts, respectively, produced by chlorinating methyl, ethyl ketone) was condensed with ammonium dithiocarbamate to form a solid mixture of 2-mercapto-4-ethylthiazole and 2-mercapto-4,5-dimethylthiazole. An aqueous solution containing 145 grams of the mixed thiazoles (90 per cent pure), 80 grams of sodium hydroxide and 250 grams of cyclohexylamine in a volume of five liters was cooled in an ice bath and oxidized by a mixture of chlorine gas and air, passed into the agitated solution during the course of three hours. The product, a mixture of about one part of N-cyclohexyl (4-ethyl-2-thiazyl) sulfenamide and three parts of N-cyclohexyl (4,5-dimethyl-2-thiazyl) sulfenamide, precipitated as a soft, tan solid, in a yield of 165 grams (78 per cent), melting at about 57–77° C. The mixture of sulfenamides was tested in the standard accelerator test formula shown in Example 1. No vulcanization occurred on heating the rubber composition for 60 minutes at 240° F. On heating the rubber composition for 20 and 60 minutes at 280° F., the following data were obtained:

| Accelerator | Modulus of Elasticity in lbs./in.² at elongation of 600% | | Tensile Strength in lbs./in.² at break | |
| --- | --- | --- | --- | --- |
| | 20 min. | 60 min. | 20 min. | 60 min. |
| Mixture of N-cyclohexyl (4-ethyl-2-thiazyl) sulfenamide and N-cyclohexyl (4,5-dimethyl-2-thiazyl) sulfenamide | 1,725 | 2,675 | 3,350 | 3,225 |

Example 5

Fifty ml. of 5.5 per cent sodium hypochlorite solution were added to 100 ml. of concentrated ammonia containing 25 grams of cracked ice. To the resulting solution there was gradually added, with stirring, 10.5 grams of 2-mercapto-4,5-dimethyl-thiazole dissolved in a solution of 5.52 grams of sodium hydroxide in 100 ml. of water. After the addition of a portion of the thiazole solution a flocculant precipitate appeared, which soon became very bulky in the reaction vessel. The mixture was stirred for a short time after the addition of the entire quantity of the thiazole solution. Then the white, crystalline precipitate was separated, washed with water and dried. The product, 4,5-dimethylthiazylsulfenamide,

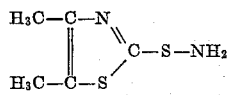

is an effective rubber vulcanization accelerator of the delayed-action type, being similar in accelerating activity to the alkyl and cyclo-alkyl derivatives specifically described above.

Example 6

Various primary amines were separately reacted with 2-mercapto-4,5-dimethylthiazole by oxidation of an alkaline aqueous mixture of one mole of the thiazole and five moles of the amine by means of an aqueous iodine-potassium iodide solution. The formulas of the specific sulfenamide derivatives so prepared are as follows:

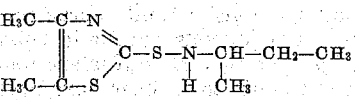

N-sec. butyl (4,5-dimethyl-2-thiazyl) sulfenamide

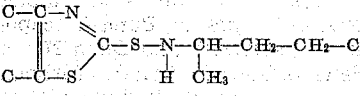

N-sec. amyl (4,5-dimethyl-2-thiazyl) sulfenamide or

N-methyl-n-propylcarbin (4,5-dimethyl-2-thiazyl) sulfenamide

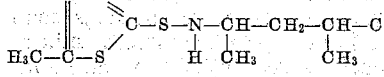

N-sec. hexyl (4,5-dimethyl-2 thiazyl) sulfenamide or

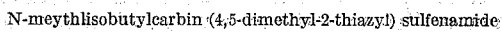

N-meythlisobutylcarbin (4,5-dimethyl-2-thiazyl) sulfenamide

In a similar manner five moles of sec. amylamine (methyl-n-propylcarbinamine) were treated with iodine in the presence of an alkaline solution of one mole of 2-mercapto-4-ethylthiazole to produce N-sec. amyl (4-ethyl-2-thiazyl) sulfenamide or N-methyl-n-propylcarbin (4-ethyl-2-thiazyl) sulfenamide, having the following formula:

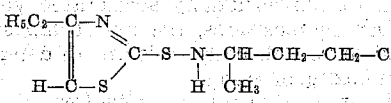

The yields and melting points of the sulfenamide derivatives so produced are set out in the following table:

| 2-Thiazylsulfenamide | Yield | Melting Point |
| --- | --- | --- |
| N-Sec. butyl-4,5-dimethyl- | 72 | 51–52° C. |
| N-Sec. amyl-4,5-dimethyl- | 56 | 40–42° C. |
| N-Sec. hexyl-4,5-dimethyl- | 51 | (liquid). |
| N-Sec. amyl-4-ethyl- | | (liquid). |

Each of the four above sulfenamide derivatives was tested in the rubber accelerator test formula of Example 1, and were found to cause no vulcanization of the rubber when the latter was heated for 60 minutes at 240° F. When the rubber compositions were heated for 40 and 60 minutes at 280° F., the following data were obtained:

| Accelerator | Modulus of Elasticity in lbs./in.² at elongation of 600% | | Tensile Strength in lbs./in.² at break | |
| --- | --- | --- | --- | --- |
| | 40 min. | 60 min. | 40 min. | 60 min. |
| N-Sec. butyl (4,5-dimethyl-2-thiazyl) sulfenamide | 2,450 | 2,425 | 3,350 | 3,575 |
| N-sec. amyl (4,5-dimethyl-2-thiazyl) sulfenamide | 2,575 | 2,550 | 3,775 | 3,625 |
| N-Sec. hexyl (4,5-dimethyl-2-thiazyl) sulfenamide | 2,450 | 2,450 | 3,525 | 3,525 |
| N-Sec. amyl (4-ethyl-2-thiazyl) sulfenamide | 2,750 | 2,600 | 3,800 | 3,325 |

The various members of the new class of chemical compounds are equally effective delayed-action vulcanization accelerators in rubber tread compounds, latex compounds or other conventional types of vulcanizable compounds of rubber, reclaimed rubber, or synthetic rubber, and consistently produce rapid-curing compositions, which in the vulcanized state possess unusually high modulus, tensile and abrasion-resisting properties. The various synthetic rubbers vulcanizable by heating with sulfur are herein considered equivalent to rubber, examples being butadiene polymers, isoprene polymers and various interpolymers of conjugated diolefins and vinyl compounds, such as Buna S (copolymer of butadiene and styrene) and Buna N (copolymer of butadiene and acrylonitrile). Although sulfur has hereinabove been mentioned as the preferred vulcanizing agent, other known vulcanizing agents susceptible to acceleration are contemplated.

The preferred class of sulfenamide derivatives may be prepared by other methods than those mentioned above. For example, a mixture of a non-aromatic mercaptothiazole and ammonia or a primary amine may be oxidized by hydrogen peroxide or other oxidizing agent. The invention is not limited to derivatives prepared in accordance with any particular method, but includes the preferred class of compounds, however they may have been formed.

In addition to the above-enumerated desirable properties imparted by the new accelerators to rubber compositions, it has been found that the vulcanized compositions also are highly efficient, having low hysteresis characteristics. When compared to conventionally accelerated vulcanized rubber compositions, the new compositions are found to be unusually resistant to deterioration upon flexing or aging.

Conventional accelerator activators may be employed to an advanatge with the new class of accelerators when extremely rapid vulcanization is desired, especially at lower temperatures. Also, the new accelerators may be used in combination with other accelerators, such as a guanidine (e. g., diphenyl guanidine) or a conventional mercaptothiazole derivative (e. g., mercaptobenzothiazole or dibenzothiazyl disulfide), in order to produce rubber compositions having especially rapid or specific vulcanizing properties. The new accelerators may be employed in other proportions than the proportion shown, but will normally be utilized in the range of 0.1 to 10 parts per 100 parts of rubber.

Modification may be resorted to and obvious chemical equivalents substituted in the specific examples of the invention without departing from the spirit or scope of the invention as defined in the appended claims.

What is claimed is:

1. N-cyclohexyl (4-methyl-2-thiazyl) sulfenamide.

2. N-isopropyl (4,5-dimethyl-2-thiazyl) sulfenamide.

3. A composition of matter consisting of a mixture of N-cyclohexyl (4-ethyl-2-thiazyl) sulfenamide and N-cyclohexyl (4,5-dimethyl-2-thiazyl) sulfenamide.

4. A substance having the formula,

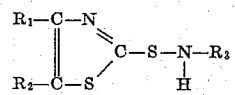

wherein $R_1$ and $R_2$ are selected from the group consisting of hydrogen and alkyl radicals, at least one of said $R_1$ and $R_2$ being an alkyl radical, and $R_3$ is one of the group consisting of hydrogen, alkyl radicals and cyclo-alkyl radicals.

GEORGE E. P. SMITH, JR.
EDWARD L. CARR.

REFERENCES CITED

The following references are of record in the file of this patent:

UNITED STATES PATENTS

| Number | Name | Date |
|---|---|---|
| 2,445,772 | Carr et al. | July 20, 1948 |

Certificate of Correction

Patent No. 2,459,736. January 18, 1949.

GEORGE E. P. SMITH, Jr., ET AL.

It is hereby certified that errors appear in the printed specification of the above numbered patent requiring correction as follows:

Column 7, line 36, for "advanatge" read *advantage*; column 8, line 42, list of references cited, for the patent number "2,445,772" read *2,445,722*;

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*